Patented Mar. 18, 1952

2,589,313

UNITED STATES PATENT OFFICE 2,589,313

TREATING LITHOGRAPHIC PLATES

William H. Wood, University Heights, Ohio, assignor to Harris-Seybold-Potter Company, Cleveland, Ohio, a corporation of Ohio No Drawing. Application June 21, 1944,
Serial No. 541,476

12 Claims. (Cl. 101—149.2)

Customarily, gum arabic is the agent used for application to plates in lithographic printing, as a "de-sensitizing etch," and for moistening the plates during the printing, and for a protective coating during idle periods on the press or in storage. The disadvantages of gum arabic however are well recognized in the trade. As a natural product it is subject to considerable variation in quality, and it is also prone to contain foreign matter of various kinds which necessitates purification. In making up for use, it has the disadvantage of dissolving in water very slowly, and the preparation of solutions is tedious. As the known dampening solutions of gum arabic must be applied in considerable amounts during printing in order to maintain the non-printing areas clean and de-sensitized to ink, such solution tends to emulsify the ink and weaken the printing, and cause scumming of the plate and stripping of the ink from the ink rollers. The pronounced acidic character of gum arabic is detrimental also in its tendency to corrode printing plates which are in storage for some time. In accordance with the present invention, a synthetically prepared material for plate treatment may be had, which affords advantages of uniformity, highly superior moisture attractiveness, and plate protection. And withal, costs are moderate.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

I have found that polysaccharid carboxy-ethers are of remarkable utility in lithographic plate treatment. Particularly valuable are the carboxy-ethers of cellulose, starch, and of water-soluble gums containing saccharid units, as for instance gum arabic, tragacanth, mesquite, larch gum, etc. These polymers react readily under suitable conditions to form the carboxy-ethers. The cellulose carboxy-ether is on the market as the sodium salt, and any of the carboxy-ethers are prepared according to the known procedure, by dissolving the polymer or polysaccharid in an alkalin solution such as of caustic soda or of trimethylbenzyl ammonium hydroxide (each about 40 per cent concentration in water), and reacting at around room temperature with a suitable halogenated organic acid, such for instance as chloracetic acid, chloromaleic acid, chloromalonic acid, chloropropionic acid, etc. After reaction, excess alkali is neutralized with phosphoric or other mineral acid, and the ether is precipitated in alcohol or acetone as the alkali salt. The carboxy-methyl ethers of cellulose, starch, and the water-soluble gums are especially desirable. The carboxy-methyl ether grouping is

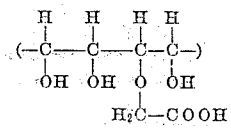

Some of the hydroxyls react, while others remain free to attract moisture, and the relatively large number of these may account for the superior moisture retentiveness of these materials in plate-treating usage. The carboxyl groups are adsorbed on metallic plate surfaces, and apparently account for the superior durability of these treating substances.

The carboxy-ethers un-neutralized or as the salts may be used, and both are included in the designation "carboxy-ether" hereinafter.

The polysaccharid carboxy-ethers may be used in quite a range of concentrations, as the amounts are not critical. For a de-sensitizing plate etch, a 5 per cent concentration is satisfactory, although in general from 1 to 10 per cent may be employed. As in the case with gum arabic, one or more of the plate de-sensitizing agents as known for treating lithographic plates, may be included, these being for instance acids or salts providing in solution an effective chromium providing agent, e. g. chromate, as by chromic acid, ammonium or sodium or potassium bichromate, etc., or chromic, as in chrome alum, etc.; acids or salts providing in solution a phosphate ion, as phosphoric acid, ammonium or sodium or potassium phosphate, etc., nitrates, zirconium salts, aluminum salts, tannic acid, etc. Concentrations of about 6 per cent of soluble bichromate are satisfactory, although the amount may be greater or less, as desired, the concentrations of the ingredients not being critical, and considerable variation is possible consistent with the mode of applying the solution and the results desired.

For dampening usage, generally a solution of 0.01 to 0.02 per cent concentration of the carboxy-ether gives good results. However, more, as up to 5 or 10 per cent can be used.

The carboxy-ether in its acid form may be employed, or it may be used in the form of its alkali salt. Preferably, a slightly acid solution of the polysaccharid carboxy-ether is employed, as the free carboxyl groups available give better adsorption on the plate.

Examples of carboxy-ether solutions for plate treatment are as follows:

For de-sensitizing plates: Two aqueous solutions are made up, of which one comprises two ounces of ammonium bichromate per pint of water, and the other solution comprises 5 per cent of cellulose carboxy-methyl ether and one ounce of phosphoric acid per pint. Equal parts of these solutions are mixed together for application to the plate.

For dampening during printing: One ounce of each of the foregoing solutions is made up with two gallons of water, and is supplied to the water fount.

For protective coating of the plates: A 5 per cent solution of cellulose carboxy-methyl ether is coated on the plate. A higher concentration, as up to 10 per cent, can be used.

So much less dampening fluid is required during printing in the usage of the present dampening solutions, that the common emulsification and scumming and stripping tendencies are obviated, and particularly clear prints are obtainable.

Other modes of applying the principle of the invention may be employed, change being made as regards the details described, provided the features stated in any of the following claims, or the equivalent of such, be employed.

I therefore particularly point out and distinctly claim as my invention:

1. In the treatment of lithographic printing plates, applying to the image bearing metal plate a solution essentially of a polysaccharid carboxy-ether.

2. In the treatment of lithographic printing plates, applying to the image bearing metal plate an aqueous solution containing essentially a polysaccharid carboxy-ether and a plate de-sensitizing agent.

3. In the treatment of lithographic printing plates, applying to the image bearing metal plate an aqueous solution containing essentially a cellulose carboxy-ether and a plate de-sensitizing agent.

4. In the treatment of lithographic printing plates, applying to the image bearing metal plate an aqueous solution containing a starch carboxy-ether and a plate de-sensitizing agent.

5. In the treatment of lithographic printing plates, applying to the image bearing metal plate an aqueous solution containing a gum carboxy-ether and a plate de-sensitizing agent.

6. In the treatment of lithographic printing plates, applying to the image bearing metal plate essentially a solution of a cellulose carboxy-methyl ether.

7. In the treatment of lithographic printing plates, applying to the image bearing metal plate an aqueous solution containing essentially a cellulose carboxy-methyl ether and a plate de-sensitizing agent.

8. A lithographic printing plate bearing a printing image and having a coating essentially of polysaccharid carboxy-ether.

9. A lithographic plate bearing a printing image and having a coating essentially of cellulose carboxy-ether.

10. A lithographic plate bearing a printing image and having a coating of starch carboxy-ether.

11. A lithographic plate bearing a printing image and having a coating of gum carboxy-ether.

12. A lithographic printing plate bearing a printing image and having a coating essentially of cellulose carboxy-methyl ether.

WILLIAM H. WOOD.

REFERENCES CITED

The following references are of record in the file of this patent:

UNITED STATES PATENTS

| Number | Name | Date |
|---|---|---|
| 2,184,310 | Meigs | Dec. 26, 1939 |
| 2,216,736 | Carothers | Oct. 8, 1940 |
| 2,236,545 | Maxwell | Apr. 1, 1941 |
| 2,250,516 | Wood | July 29, 1941 |
| 2,331,245 | Stockmeyer | Oct. 5, 1943 |
| 2,340,072 | Medl | Jan. 25, 1944 |
| 2,362,761 | Medl | Nov. 14, 1944 |

OTHER REFERENCES

Sodium Carboxymethylcellulose Cellulose Products Dept. of the Hercules Powder Co. Wilmington, Delaware. (Copy in Div. 64.)